(12) United States Patent
Fifer

(10) Patent No.: US 10,390,116 B1
(45) Date of Patent: Aug. 20, 2019

(54) OPTICAL MODEM LINE TIMING

(71) Applicant: Ciena Corporation, Hanover, MD (US)

(72) Inventor: Vincent Fifer, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/205,358

(22) Filed: Nov. 30, 2018

(51) Int. Cl.
| | |
|---|---|
| *G02F 1/00* | (2006.01) |
| *H04Q 11/00* | (2006.01) |
| *H04L 7/00* | (2006.01) |
| *H04J 14/08* | (2006.01) |
| *H04L 7/04* | (2006.01) |

(52) U.S. Cl.
CPC .......... *H04Q 11/0066* (2013.01); *H04J 14/08* (2013.01); *H04L 7/0079* (2013.01); *H04L 7/042* (2013.01); *H04J 2203/006* (2013.01); *H04Q 2011/0081* (2013.01)

(58) Field of Classification Search
CPC ......... H04Q 11/0066; H04Q 2011/0081; H04J 14/08; H04J 2203/006; H04L 7/0079; H04L 7/042
USPC ................................................ 398/8, 154, 35
See application file for complete search history.

(56) References Cited

U.S. PATENT DOCUMENTS

| | | | | |
|---|---|---|---|---|
| 7,539,200 | B2 * | 5/2009 | Bedrosian ............. | H04J 3/0658 370/395.62 |
| 9,735,905 | B2 * | 8/2017 | Wang ................... | H04J 3/0697 |
| 2005/0025496 | A1 * | 2/2005 | Akita ................... | H04B 10/299 398/140 |

FOREIGN PATENT DOCUMENTS

EP   2343807 A1 *  7/2011  ............ H03L 7/143

* cited by examiner

*Primary Examiner* — Mohammad R Sedighian
(74) *Attorney, Agent, or Firm* — Clements Bernard Walker PLLC; Christopher L. Bernard; Lawrence A. Baratta, Jr.

(57) ABSTRACT

An optical modem includes client interface circuitry; line interface circuitry configured to interface a client signal with the client interface circuitry and interface a line signal in a transmit direction and a receive direction, wherein the line signal terminates at a second optical modem; and a clock connected to the line interface circuitry, wherein the clock includes a selector configured to select one of a local reference clock and a recovered clock from the receive direction based on whether the optical modem is a master or slave and based on whether there is a fault in the receive direction, wherein the optical modem and the second optical modem form a timing island separate from a timing domain associated with the client signal and a second client signal associated with the second optical modem.

20 Claims, 5 Drawing Sheets

OPTICAL MODEM LINE TIMING

FIELD OF THE DISCLOSURE

The present disclosure generally relates to optical networking. More particularly, the present disclosure relates to systems and methods for optical modem line timing.

BACKGROUND OF THE DISCLOSURE

Optical networking has proliferated with the increasing demands for bandwidth. As such, optical networks have evolved to utilize coherent optical modems which support hundreds of gigabits of capacity. Optical modems are deployed in a bidirectional configuration where two nodes are used to communicate client data (e.g., Ethernet, Optical Transport Network (OTN), etc.). There is a requirement to provide timing synchronization (via a clock at each node) between the transmit and receive directions in the bidirectional configuration. Line timing where one optical modem is timed off another optical modem is preferred as this ensures there is no frequency difference between the transmit and receive directions. However, conventionally, line timing is only used in a loopback configuration (where the recovered data is propagated to the transmitter). Without line timing, there is a frequency difference between the transmit and receive directions inhibiting optimal performance. The conventional approach includes the use of two clocks at each node, a transmit clock and a receive clock, and a clock recovery technique for synchronization.

BRIEF SUMMARY OF THE DISCLOSURE

In an embodiment, an optical modem includes client interface circuitry; line interface circuitry configured to interface a client signal with the client interface circuitry and interface a line signal in a transmit direction and a receive direction, wherein the line signal terminates at a second optical modem; and a clock connected to the line interface circuitry, wherein the clock includes a selector configured to select one of a local reference clock and a recovered clock from the receive direction based on whether the optical modem is a master or slave and based on whether there is a fault in the receive direction, wherein the optical modem and the second optical modem form a timing island separate from a timing domain associated with the client signal and a second client signal associated with the second optical modem.

The transmit direction can include a transmitter circuit connected to the clock and the receive direction can include a receiver circuit connected to the clock, each receiving the same clock signal from the clock based on the selector. The receiver circuit can provide the recovered clock to the selector and a control signal for setting the selector. The receiver circuit can provide the recovered clock to the selector and a control signal embedded in the recovered clock for setting the selector. When the optical modem is set as the master, the selector is set to select the local reference clock, and, when the optical modem is set as the slave, the selector is set to select the recovered clock absent any faults. The timing island between the optical modem and the second optical modem is synchronous while timing domains associated with the client signal at the optical modem is asynchronous. The client signal can be one of Optical Transport Network (OTN) and Ethernet.

A method implemented at a first optical modem includes interfacing a client signal from client interface circuitry with line interface circuitry; optically interfacing a line signal based on the client signal in a transmit direction and a receive direction with a second optical modem; and providing a clock to line interface circuitry in both the transmit direction and the receive direction based on a selector configured to select one of a local reference clock and a recovered clock from the receive direction based on whether the first optical modem is a master or slave and based on whether there is a fault in the receive direction, wherein the optical modem and the second optical modem form a timing island separate from a timing domain associated with the client signal and a second client signal associated with the second optical modem.

At the first optical modem, the transmit direction can include a transmitter circuit connected to the clock and the receive direction includes a receiver circuit connected to the clock, each receiving a same clock signal from the clock based on the selector. The receiver circuit can provide the recovered clock to the selector and a control signal for setting the selector. The receiver circuit can provide the recovered clock to the selector and a control signal embedded in the recovered clock for setting the selector. When the first optical modem is set as the master, the selector is set to select the local reference clock, and, when the first optical modem is set as the slave, the selector is set to select the recovered clock absent any faults. The timing island between the optical modem and the second optical modem is synchronous while timing domains associated with the client signal at the optical modem is asynchronous. The method of claim 9, wherein the client signal can be one of Optical Transport Network (OTN) and Ethernet.

In a further embodiment, an optical system includes a first optical modem set as a master and configured to use a same local reference clock in a transmit direction and a receive direction, wherein the first optical modem includes line interface circuitry configured to interface a client signal with client interface circuitry and interface a line signal in the transmit direction and the receive direction; and a second optical modem set as a slave and configured to use a recovered clock from the receive direction which is recovered as the local reference clock from the first optical modem, wherein the second optical modem utilizes the recovered clock in the transmit direction and the receive direction, and wherein, responsive to a fault in the receive direction, the second optical modem utilizes its local reference clock instead of the recovered clock, wherein the first optical modem and the second optical modem form a timing island separate from a timing domain associated with the client signal and a second client signal associated with the second optical modem.

Each of the first optical modem and the second optical modem can include a transmitter circuit configured to receive a clock in the transmit direction, and a receiver circuit configured to receive the clock in the receive direction. The receiver circuit can provide the recovered clock to the selector and a control signal for setting whether its local reference clock or the recovered clock is used. The receiver circuit can provide the recovered clock to the selector and a control signal embedded in the recovered clock for setting whether its local reference clock or the recovered clock is used. The timing island between the first optical modem and the second optical modem is synchronous while timing domains associated with the client signal is asynchronous. The client signal can be one of Optical Transport Network (OTN) and Ethernet.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

In various embodiments, the present disclosure relates to systems and methods for optical modem line timing. The systems and methods eliminate the need for unique transmit and receive clocks at each node and enables line timing in asynchronously mapped (OTN, Ethernet, etc.) networks. Specifically, the systems and methods utilize a master/slave relationship between two optical modems in a bidirectional configuration to maintain zero frequency error between the transmit and receive directions. This is achieved by line timing the slave optical modem from the master optical modem. Advantageously, a coherent receiver using phase rotator architecture is optimized when there is a zero frequency difference realized between the receive data and the receiver clock domain. Operating the Tx and Rx clock domains at the same frequency negates interference between the two domains. Also, line timing the slave optical modem eliminates the need for separate clock circuitry for the transmitter and the receiver while still achieving zero frequency error. This holds true for both the master and slave optical modems. There can be a common clock synthesis block for both the master and slave optical modems that reduces cost, power, and physical footprint.

The optical modem receiver Clock and Data Recovery (CDR) acquisition range must be greater than two times the inaccuracies of the local modem reference frequency. The CDR loop bandwidth is much wider than the clock synthesis loop bandwidth. The reference clock selection on the slave optical modem results in a controlled phase transient during a hitless switch.

Figure 1:
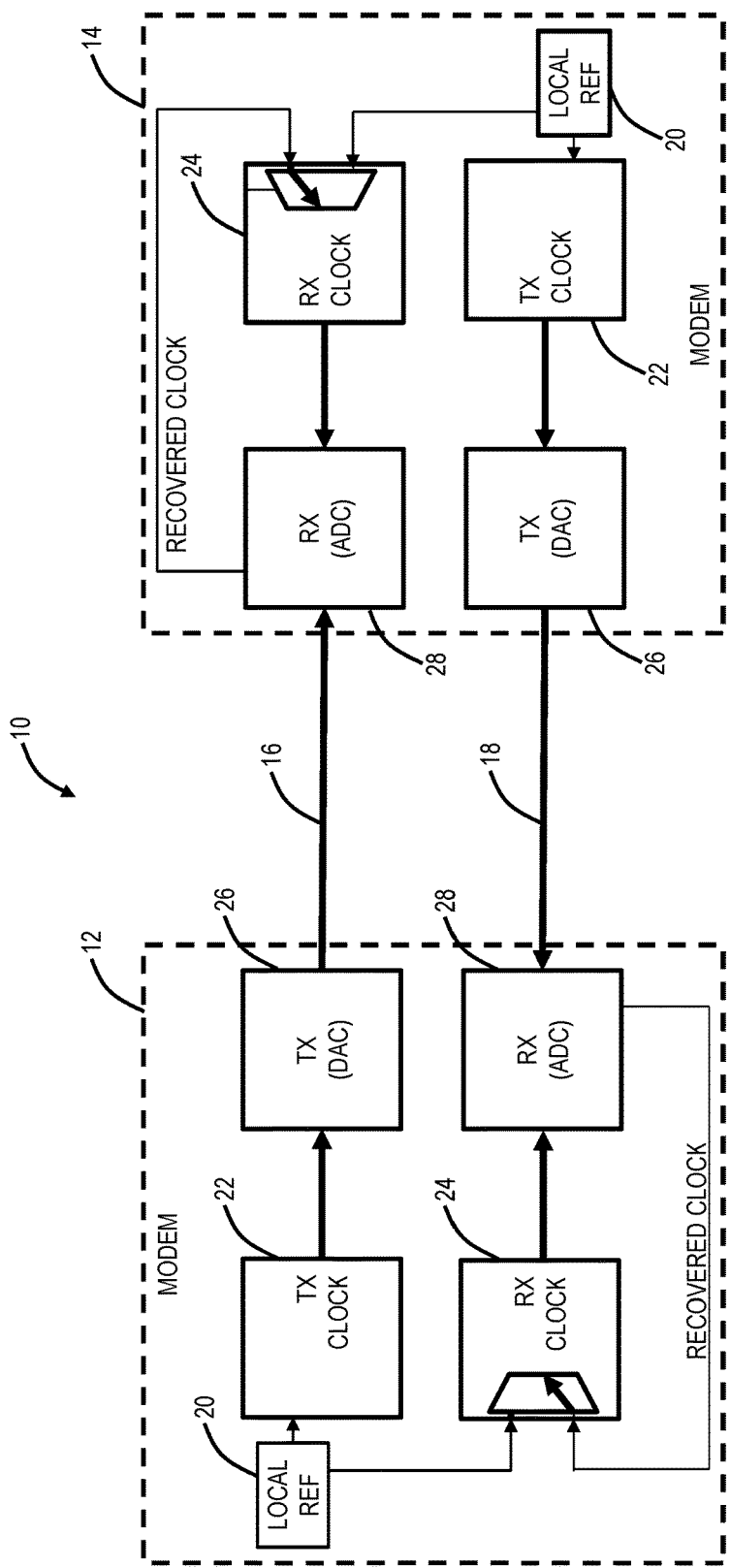
FIG. 1 is a block diagram of a conventional optical modem system.

FIG. 1 is a block diagram of a conventional optical modem system 10. The optical modem system 10 includes a first optical modem 12 connected bidirectionally to a second optical modem 14 via a transmit link 16 and a receive link 18. The optical modems 12, 14 include identical components and for illustration purposes, FIG. 1 includes clock related components. Those of ordinary skill in the art will appreciate a modem implementation contemplates additional circuitry which is omitted for illustration purposes. The additional circuitry can include framing (e.g., OTN), Forward Error Correction (FEC), Digital Signal Processing (DSP), electro-optic conversion, Serializer/Deserializer (SERDES), etc.

From a clock perspective, the optical modems 12, 14 include a local reference clock 20 which is connected to both a transmit clock 22 and a receive clock 24. The local reference clock 20 provides a local timing reference. In the transmit direction, the transmit clock 22 connects to a transmitter circuit 26 which can include a Digital-to-Analog Converter (DAC) can communicate over the link (optically and the associated optical components are omitted in FIG. 1) to a receiver circuit 28 which can include an Analog-to-Digital Converter (ADC) on the optical modem 14. The receiver circuit 28 provides a recovered clock to the receive clock 24. The receive clock 24 can include a selector which selects one of the recovered clock and the local reference clock 20.

This conventional optical modem system 10 requires the extra receive clock synthesize to achieve the zeroing out the frequency delta. Also, there can be two different timing domains between the transmit link 16 and the receive link 18 which can couple noise between one another.

Figure 2:
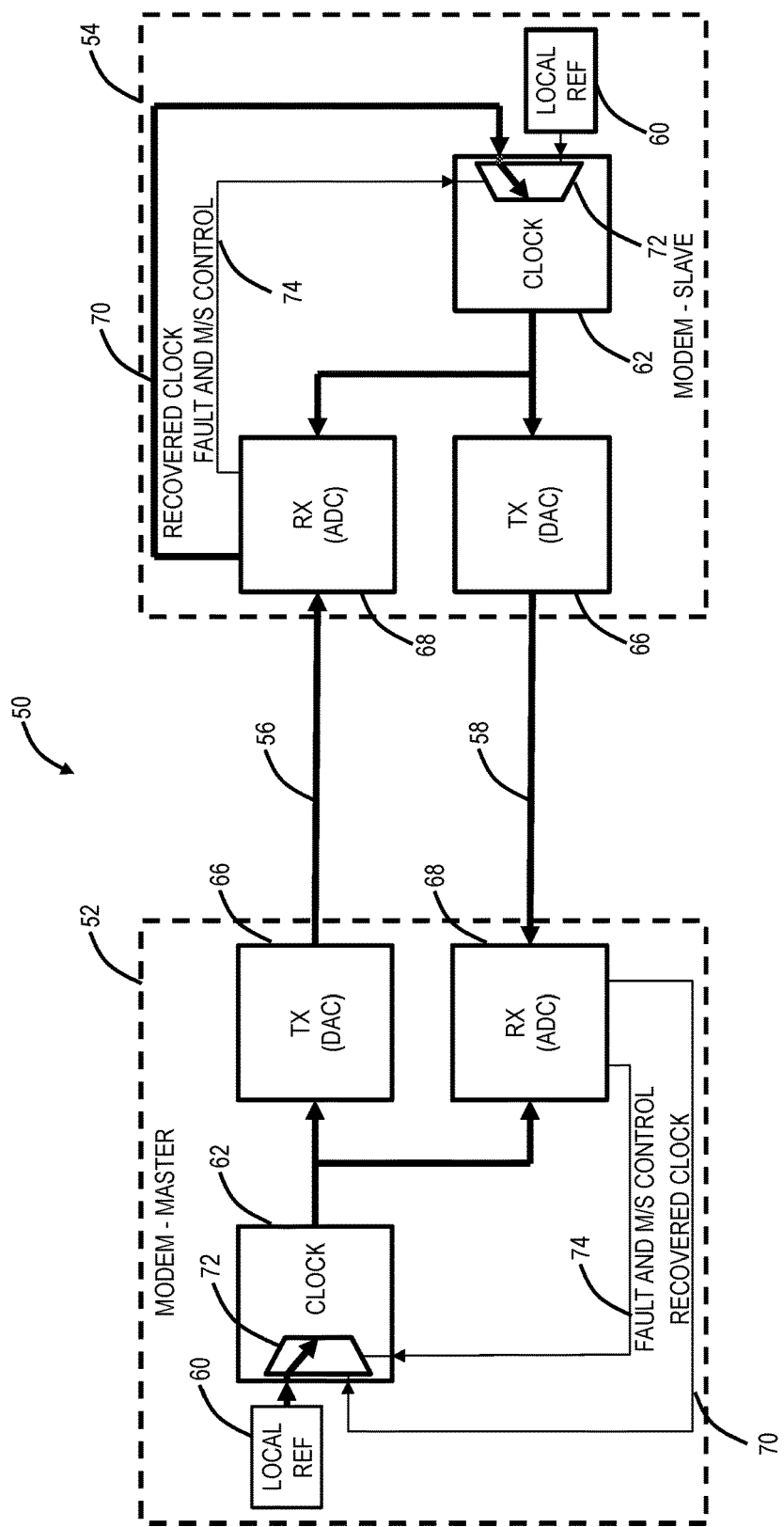
FIG. 2 is a block diagram of a line timed optical modem system.

FIG. 2 is a block diagram of a line timed optical modem system 50. The optical modem system 50 includes a first optical modem 52 connected bidirectionally to a second optical modem 54 via a transmit link 56 and a receive link 58. The optical modems 52, 54 include identical components and for illustration purposes, FIG. 2 includes clock related components. Those of ordinary skill in the art will appreciate a modem implementation contemplates additional circuitry which is omitted for illustration purposes. The additional circuitry can include framing (e.g., OTN), Forward Error Correction (FEC), Digital Signal Processing (DSP), electro-optic conversion, Serializer/Deserializer (SERDES), etc.

The line timed optical modem system 50, in contrast to the conventional optical modem system 10, treats the optical modems 52, 54 as a timing island, i.e., the timing between the optical modems 52, 54 is a book-end which is independent of client timing. While not shown in FIGS. 1 and 2, client timing would extend from the left side of the optical modems 12, 52 and the right side of the optical modems 14, 54. Accordingly, the line timed optical modem system 50 is an independent timing domain. In this manner, the optical modems 52, 54 can support line timing because the client signals are asynchronously mapped into the line time domain (e.g., Ethernet, OTN). That is, the client signals (Ethernet, OTN, etc.) can support their own timing independent of the optical modems 52, 54. In this manner, the line timed optical modem system 50 overcomes the aforementioned limitation where line timing in a synchronously mapped systems was constrained to a data loopbacks only (where the links 56, 58 carry identical traffic). This concept of an optical modem timing island where timing is synchronized only between adjacent optical modems 52, 54 is a key aspect for supporting line timing with the underlying client data being asynchronous (and hence different data in the transmit and receive direction).

In FIG. 2, from a clock perspective, the optical modems 52, 54 include a local reference clock 60 which is connected to both a single clock 62. Again, the local reference clock 60 provides a local timing reference. Note, the optical modems 52, 54 remove the extra receive clock 24 in the optical modems 12, 14. Also, note, the optical modems 52, 54 have the identical hardware, and the configuration can be via software, i.e., which of the optical modems 52, 54 is master and which is a slave. In this example, the optical modem 52 is the master, and the optical modem 54 is the slave.

In the transmit direction, the clock 62 connects to a transmitter circuit 66 which can include a DAC and can communicate over the link (optically and the associated optical components are omitted in FIG. 2) to a receiver circuit 68 which can include an ADC on the optical modem 54. The receiver circuit 68 provides a recovered clock 70 to a selector 72 in the clock 62. The selector 72 is a 1×2 switch which has two inputs—the local reference clock 60 and the recovered clock 70 from the receiver circuit 68. Again, this configuration is identical in both of the master and slave. The recovered clock 70 is obtained through CDR processes at the receiver circuit 68 to recover the clock 62 from the corresponding transmitting transmitter circuit 66.

Further, the receiver circuit 68 includes a control signal 74 which connects to and controls the selector 72, i.e., the reference clock input selection is manually controlled via hardware. The local reference 60 is always used when the optical modem 52 is set as the master. The recovered clock 70 is selected on the slave which is the optical modem 54 when the receive signal is valid. During a line fault condition or acquisition, the local reference 60 is selected by the slave which is the optical modem 54.

Figure 3:
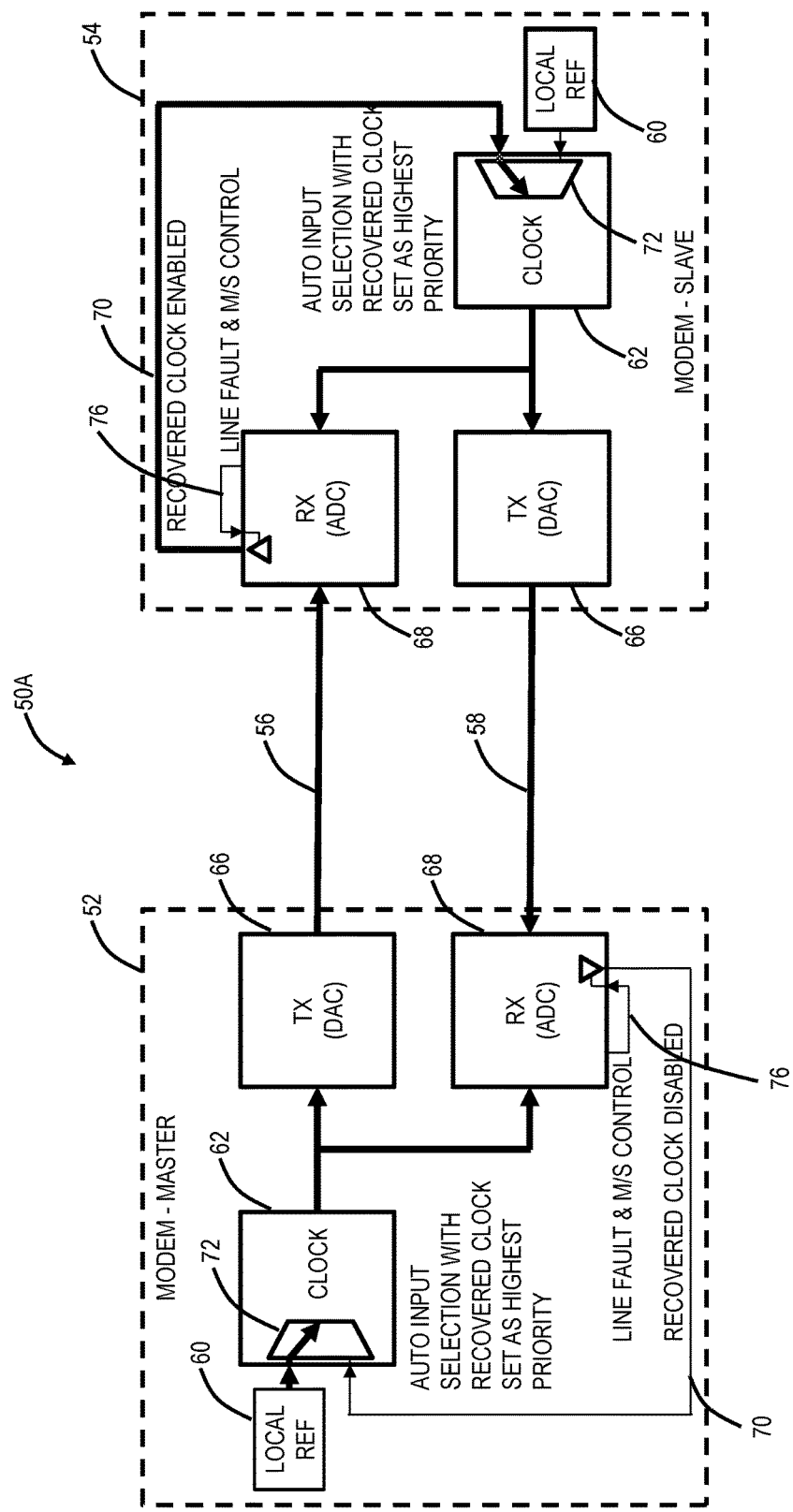
FIG. 3 is a block diagram of the line timed optical modem system with an alternate control signal approach.

FIG. 3 is a block diagram of the line timed optical modem system 50A with an alternate control signal 76 approach. The line timed optical modem system 50A has a similar structure, i.e., hardware configuration as the line timed optical modem system 50. However, the control signal 74 from the receiver circuit 68 to the selector 72 is omitted. Instead, the control signal 76 is embedded as a muting (disable) function on the recovered clock 70. Here, the input reference selection at the selector 72 can be automatically controlled using priority. The recovered clock input at the selector 72 is set as the highest priority. The master only uses its local reference clock 60, i.e., its recovered clock is always disabled.

The slave uses input reference switching at the selector 72. The slave's local reference clock 72 is selected during acquisition and fault conditions. When the receive data is valid, the recovered clock 70 is enabled and automatically selected as the input reference. When a line fault is detected, the recovered clock 70 is disabled thru hardware control, i.e., the control signal 76, which triggers a switch to the local reference clock 60 at the selector 72. The rapidity of the fault condition ensures the transient frequency depth is controlled during a link interruption.

Additionally, the optical modems 52, 54 associated with the optical signal which is the result of modulating an electrical signal onto an optical carrier. That electrical signal may have a single carrier such as with a single Time Division Multiplexing (TDM) stream of Quadrature Phase Shift Keying (QPSK) symbols, Quadrature Amplitude Modulation (QAM), Higher order modulation formats e.g., X-constellation, a plurality of carriers such as with Frequency-Division Multiplexing (FDM), or a very large number of carriers such as with Orthogonal Frequency-Division Multiplexing (OFDM). As described herein, the systems and methods specifically apply to underlying protocols which are asynchronous such as Ethernet, OTN, etc. which do not inherently support line timing for the optical modems 12, 14.

Also, the optical modems 52, 54 can use polarization multiplexing with any of the foregoing modulation formats. Any type of modulation scheme is contemplated. In an embodiment, each optical modems 52, 54 is tunable so that it can selectively generate a modulated carrier centered at the desired wavelength (or frequency). The optical modems 52, 54 can support various different baud rates through software-programmable modulation formats. The optical modems 52, 54 can support programmable modulation or constellations with both varying phase and/or amplitude. In an embodiment, the optical modems 52, 54 can support multiple coherent modulation formats such as, for example, i) dual-channel, dual polarization (DP) binary phase-shift keying (BPSK or X-Constellation) for 100G at submarine distances, ii) DP-QPSK for 100G at ultra-long haul distances, iii) 16-QAM for 200G at metro to regional (600 km) distances), or iv) dual-channel 16QAM for 400G at metro to regional distances. In another embodiment, the optical modems 52, 54 can support N-QAM modulation formats with constellation shaping with and without dual-channel and dual-polarization where N can even be a real number and not necessarily an integer. Here, the optical modems 52, 54 can support non-standard speeds since N can be an effective real number as opposed to an integer, i.e., not just 100G, 200G, or 400G, but variable speeds, such as 130G, 270G, 560G, etc. These rates could be integer multiples of 10 Gb/s, or of 1 Gb/s.

Furthermore, with Digital Signal Processing (DSP) and software programming of the optical modems 52, 54, the capacity of the optical modems 52, 54 can be adjusted upwards or downwards in a flexible and hitless manner so as not to affect the guaranteed rate. Additionally, the optical modems 52, 54 can tune and arbitrarily select spectrum (e.g., flexible grid); thus, no optical filters are required. Additionally, the optical modems 52, 54 can support various aspects of linear propagation effect mitigation (chromatic and polarization mode dispersion) as well as nonlinear propagation effect mitigation such as self-phase modulation, cross phase modulation, cross-polarization modulation and four-wave mixing in the electrical domain via appropriate DSP, thus eliminating external dispersion compensation devices, filters, etc. The optical modems 52, 54 can also adapt the forward FEC coding that is used including Hard Decision FEC implementations and Soft Decision FEC (SD-FEC), as another technique to trade-off complexity versus noise tolerance.

In general, the bit rate of the service provided by the optical modems 52, 54 is proportional to the amount of spectrum occupied and is a function of the noise tolerance. The optical modems 52, 54 can include coherent receivers which require no optical dispersion compensation or optical filters (multiplexers and demultiplexers). Also, the optical modems 52, 54 can support advanced Performance Monitoring (PMs) for feedback such as Bit Error Rate (BER), Polarization Dependent Loss (PDL), Polarization Mode Dispersion (PMD), and the like to provide accurate modeling of optical characteristics. The optical modems 52, 54 can include coherent transmitters which can provide spectral shaping allowing for more efficient spectrum use and flexible grid placement. Also, the coherent transmitters support software-selectable modulation formats allowing for optimal matching of the formats spectral efficiency to the given link condition. An example of the optical modems 52, 54 described herein is the WaveLogic line of products available from the Applicant, Ciena Corporation.

Figure 4:
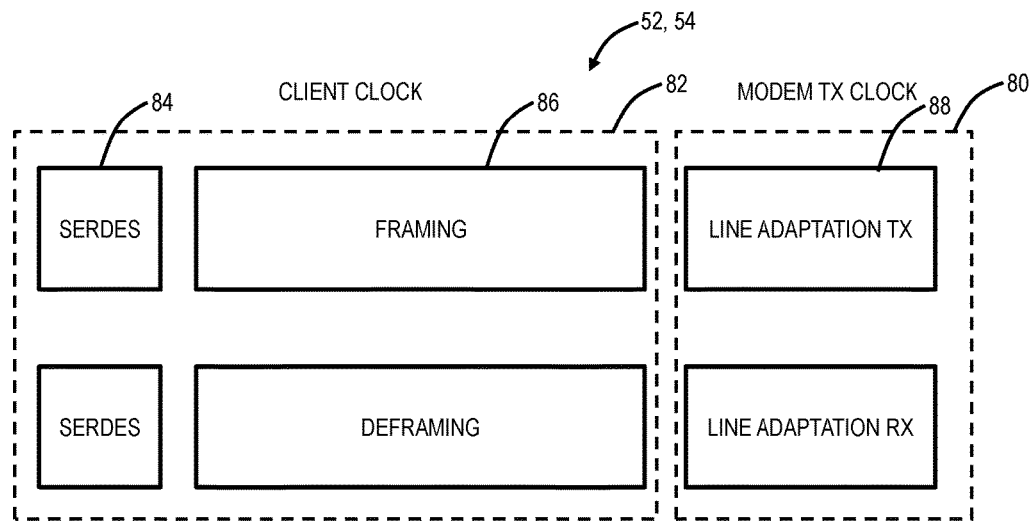
FIG. 4 is a block diagram of components of the optical modems illustrating a timing island separate from a client clock.

FIG. 4 is a block diagram of components of the optical modems 52, 54 illustrating a timing island 80 separate from a client clock 82. Generally, the optical modems 52, 54 include SERDES 84, framing/deframing circuitry 86 (framing in the transmit direction, deframing in the receive direction), and line adaptation circuit 88 (in both the transmit and receive directions). The optical modems 52, 54 also include electro-optic front ends as are known in the art, but this is omitted here for illustration purposes. Generally, the framing/deframing circuitry 86 can be referred to as client interface circuitry and the line adaptation circuit 88 can be referred to as line interface circuitry. The line clock domain is a timing island 80, and the client is asynchronously mapped into the line domain. Because of this asynchronous layer, the line timed optical modem system 50, 50A is able to utilize line timing while still maintaining a bidirectional client data link. The framing/deframing circuitry 86 can provide OTN framing/deframing, Ethernet processing, FEC, etc.

In an embodiment, an optical modem 52 includes client interface circuitry such as the framing/deframing circuitry 86; line interface circuitry such as line adaptation circuit 88 the configured to interface a client signal with the client interface circuitry and interface a line signal in a transmit direction and a receive direction, wherein the line signal terminates at a second optical modem 54; and a clock 62 connected to the line interface circuitry, wherein the clock 62 includes a selector 72 configured to select one of a local reference clock 60 and a recovered clock 70 from the receive direction based on whether the optical modem 52 is a master or slave and based on whether there is a fault in the receive direction, wherein the optical modem 52 and the second optical modem 54 form a timing island separate from a timing domain associated with the client signal and a second client signal associated with the second optical modem 54. The transmit direction includes a transmitter circuit connected to the clock 60, and the receive direction includes a receiver circuit connected to the clock 60, each receiving the same clock signal from the clock 60 based on the selector 72. The receiver circuit 68 can provide the recovered clock 70 to the selector 72 and a control signal 74 for setting the selector 72. The receiver circuit 68 can provide the recovered clock 70 to the selector 72 and a control signal 76 embedded in the recovered clock for setting the selector.

When the optical modem 52 is set as the master, the selector 72 is set to select the local reference clock 60, and, when the optical modem 52 is set as the slave, the selector 72 is set to select the recovered clock 70 absent any faults. The timing island between the optical modem 52 and the second optical modem 54 is synchronous while timing domains associated with the client signal at the optical modem 52 is asynchronous. The client signal can be one of Optical Transport Network (OTN) and Ethernet.

Figure 5:
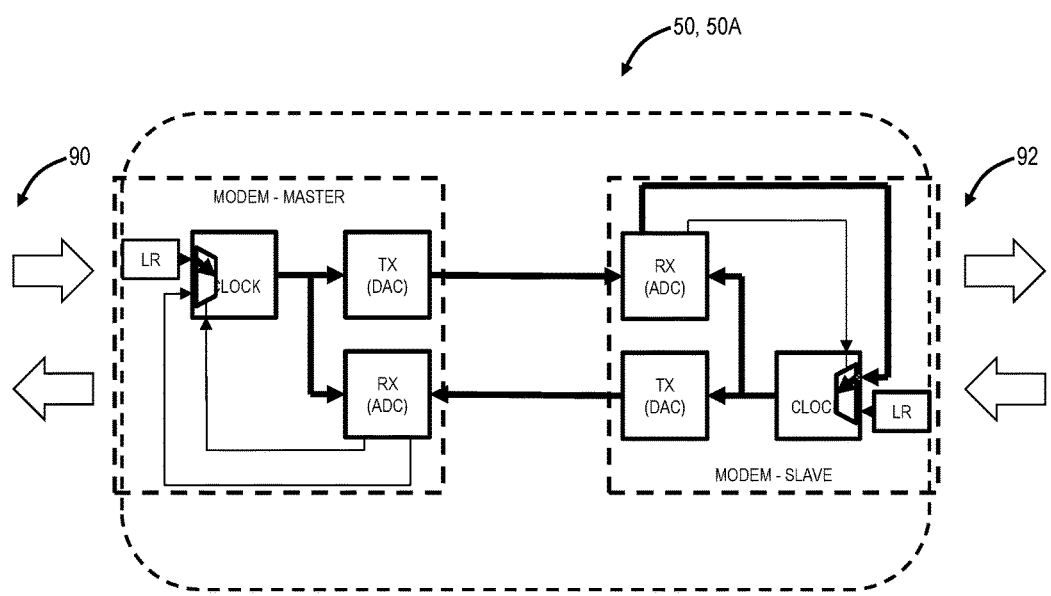
FIG. 5 is a block diagram of the line timed optical modem system relative to client data.

FIG. 5 is a block diagram of the line timed optical modem system 50, 50A relative to client data 90, 92. In the line timed optical modem system 50, 50A, the client data 90, 92 is typically OTN, Ethernet, etc., i.e., asynchronous data. The client data 90 can be referred to as westbound and the client data 92 can be referred to as eastbound (logically). Of note, the client data is uniquely timed in the eastbound and westbound directions. The optical modems 52, 54 are both operating synchronously. However the line is a timing island and the client data 90, 92 is asynchronously mapped into this timing island. The synchronization of the line is achieved through line timing.

In another embodiment, an optical system 50, 50A includes a first optical modem 52 set as a master and configured to use a same local reference clock in a transmit direction and a receive direction, wherein the first optical modem includes line interface circuitry configured to interface a client signal with client interface circuitry and interface a line signal in the transmit direction and the receive direction; and a second optical modem 54 set as a slave and configured to use a recovered clock from the receive direction which is recovered as the local reference clock from the first optical modem, wherein the second optical modem utilizes the recovered clock in the transmit direction and the receive direction, and wherein, responsive to a fault in the receive direction, the second optical modem utilizes its local reference clock instead of the recovered clock, wherein the first optical modem and the second optical modem form a timing island separate from a timing domain associated with the client signal and a second client signal associated with the second optical modem.

Each of the first optical modem and the second optical modem include a transmitter circuit configured to receive a clock in the transmit direction, and a receiver circuit configured to receive the clock in the receive direction. The receiver circuit can provide the recovered clock to the selector and a control signal for setting whether its local reference clock or the recovered clock is used. The receiver circuit can provide the recovered clock to the selector and a control signal embedded in the recovered clock for setting whether its local reference clock or the recovered clock is used. The timing island between the first optical modem and the second optical modem can be synchronous while timing domains associate with the client signal as asynchronous. The client signal can be one of Optical Transport Network (OTN) and Ethernet.

Figure 6:
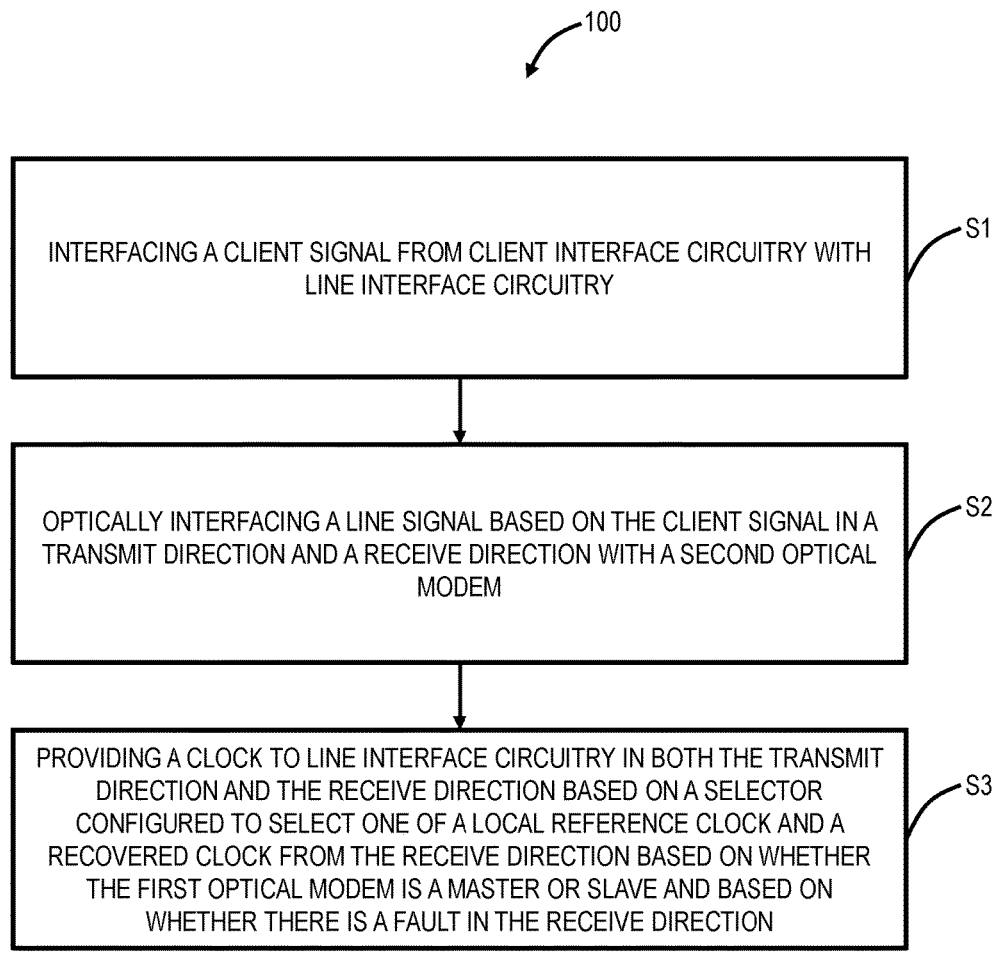
FIG. 6 is a flowchart of a line timed optical process.

FIG. 6 is a flowchart of a line timed optical process 100. The line timed optical process 100 is implemented at one of the optical modems 52, 54. The line timed optical process 100 includes interfacing a client signal from client interface circuitry with line interface circuitry (step S1); optically interfacing a line signal based on the client signal in a transmit direction and a receive direction with a second optical modem (step S2); and providing a clock to line interface circuitry in both the transmit direction and the receive direction based on a selector configured to select one of a local reference clock and a recovered clock from the receive direction based on whether the first optical modem is a master or slave and based on whether there is a fault in the receive direction (step S3), wherein the optical modem and the second optical modem form a timing island separate from a timing domain associated with the client signal and a second client signal associated with the second optical modem.

At the first optical modem, the transmit direction includes a transmitter circuit connected to the clock, and the receive direction includes a receiver circuit connected to the clock, each receiving the same clock signal from the clock based on the selector. The receiver circuit can provide the recovered clock to the selector and a control signal for setting the selector. The receiver circuit can provide the recovered clock to the selector and a control signal embedded in the recovered clock for setting the selector. When the first optical modem is set as the master, the selector is set to select the local reference clock, and, when the first optical modem is set as the slave, the selector is set to select the recovered clock absent any faults. The timing island between the optical modem and the second optical modem can be synchronous while timing domains associated with the client signal at the optical modem can be asynchronous. The client signal can be one of Optical Transport Network (OTN) and Ethernet.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical modem comprising:
    client interface circuitry;
    line interface circuitry configured to interface a client signal with the client interface circuitry and interface a line signal in a transmit direction and a receive direction, wherein the line signal terminates at a second optical modem; and
    a clock connected to the line interface circuitry, wherein the clock includes a selector configured to select one of a local reference clock and a recovered clock from the receive direction based on whether the optical modem is a master or slave and based on whether there is a fault in the receive direction,
    wherein the optical modem and the second optical modem form a timing island separate from a timing domain associated with the client signal and a second client signal associated with the second optical modem.

2. The optical modem of claim 1, wherein the transmit direction includes a transmitter circuit connected to the clock and the receive direction includes a receiver circuit connected to the clock, each receiving the same clock signal from the clock based on the selector.

3. The optical modem of claim 2, wherein the receiver circuit provides the recovered clock to the selector and a control signal for setting the selector.

4. The optical modem of claim 2, wherein the receiver circuit provides the recovered clock to the selector and a control signal embedded in the recovered clock for setting the selector.

5. The optical modem of claim 1, wherein, when the optical modem is set as the master, the selector is set to select the local reference clock, and, when the optical modem is set as the slave, the selector is set to select the recovered clock absent any faults.

6. The optical modem of claim 1, wherein the timing island between the optical modem and the second optical modem is synchronous while timing domains associated with the client signal at the optical modem is asynchronous.

7. The optical modem of claim 1, wherein the client signal is one of Optical Transport Network (OTN) and Ethernet.

8. A method implemented at a first optical modem comprising:
    interfacing a client signal from client interface circuitry with line interface circuitry;
    optically interfacing a line signal based on the client signal in a transmit direction and a receive direction with a second optical modem; and
    providing a clock to line interface circuitry in both the transmit direction and the receive direction based on a selector configured to select one of a local reference clock and a recovered clock from the receive direction based on whether the first optical modem is a master or slave and based on whether there is a fault in the receive direction,
    wherein the first optical modem and the second optical modem form a timing island separate from a timing domain associated with the client signal and a second client signal associated with the second optical modem.

9. The method of claim 8, wherein, at the first optical modem, the transmit direction includes a transmitter circuit connected to the clock and the receive direction includes a receiver circuit connected to the clock, each receiving a same clock signal from the clock based on the selector.

10. The method of claim 9, wherein the receiver circuit provides the recovered clock to the selector and a control signal for setting the selector.

11. The method of claim 10, wherein the receiver circuit provides the recovered clock to the selector and a control signal embedded in the recovered clock for setting the selector.

12. The method of claim 8, wherein, when the first optical modem is set as the master, the selector is set to select the local reference clock, and, when the first optical modem is set as the slave, the selector is set to select the recovered clock absent any faults.

13. The method of claim 8, wherein the timing island between the first optical modem and the second optical modem is synchronous while timing domains associated with the client signal at the first optical modem is asynchronous.

14. The method of claim 8, wherein the client signal is one of Optical Transport Network (OTN) and Ethernet.

15. An optical system comprising:
    a first optical modem set as a master and configured to use a same local reference clock in a transmit direction and a receive direction, wherein the first optical modem includes line interface circuitry configured to interface a client signal with client interface circuitry and interface a line signal in the transmit direction and the receive direction; and
    a second optical modem set as a slave and configured to use a recovered clock from the receive direction which is recovered as the local reference clock from the first optical modem, wherein the second optical modem utilizes the recovered clock in the transmit direction and the receive direction, and wherein, responsive to a fault in the receive direction, the second optical modem utilizes its local reference clock instead of the recovered clock, wherein the first optical modem and the second optical modem form a timing island separate from a timing domain associated with the client signal and a second client signal associated with the second optical modem.

16. The optical system of claim 15, wherein each of the first optical modem and the second optical modem include
a transmitter circuit configured to receive a clock in the transmit direction, and
a receiver circuit configured to receive the clock in the receive direction.

17. The optical system of claim 16, wherein the receiver circuit provides the recovered clock to a selector and a control signal for setting whether its local reference clock or the recovered clock is used.

18. The optical system of claim 16, wherein the receiver circuit provides the recovered clock to a selector and a control signal embedded in the recovered clock for setting whether its local reference clock or the recovered clock is used.

19. The optical system of claim 15, wherein the timing island between the first optical modem and the second optical modem is synchronous while timing domains associated with the client signal is asynchronous.

20. The optical system of claim 15, wherein the client signal is one of Optical Transport Network (OTN) and Ethernet.

* * * * *